United States Patent
Mashimo

(10) Patent No.: US 10,275,304 B2
(45) Date of Patent: Apr. 30, 2019

(54) INFORMATION PROCESSING APPARATUS, INFORMATION PROCESSING SYSTEM AND METHOD FOR MONITORING ERRORS

(71) Applicant: FUJITSU LIMITED, Kawasaki-shi, Kanagawa (JP)

(72) Inventor: Masashi Mashimo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 15/332,259

(22) Filed: Oct. 24, 2016

(65) Prior Publication Data

US 2017/0039100 A1 Feb. 9, 2017

Related U.S. Application Data

(63) Continuation of application No. PCT/JP2014/063392, filed on May 20, 2014.

(51) Int. Cl.
*G06F 11/07* (2006.01)
*G06K 9/62* (2006.01)

(52) U.S. Cl.
CPC ........ *G06F 11/079* (2013.01); *G06F 11/0706* (2013.01); *G06F 11/0751* (2013.01); *G06F 11/0787* (2013.01); *G06K 9/6202* (2013.01)

(58) Field of Classification Search
None
See application file for complete search history.

(56) References Cited

U.S. PATENT DOCUMENTS 5,852,720 A 12/1998 Gready et al.
6,173,340 B1 1/2001 Gready et al.
8,060,795 B2 * 11/2011 Bakekolo ............ G06F 11/0706 714/57
2007/0271585 A1* 11/2007 Taguchi ............... H04N 17/004 725/105
2009/0305680 A1* 12/2009 Swift ...................... H04L 43/00 455/414.1

(Continued)

FOREIGN PATENT DOCUMENTS

JP 10-66061 3/1998
JP 10-116254 5/1998
JP 2007-148712 6/2007

(Continued)

OTHER PUBLICATIONS

International Search Report dated Aug. 5, 2014 in PCT/JP2014/063392, filed on May 20, 2014.

(Continued)

*Primary Examiner* — Michelle M Entezari
(74) *Attorney, Agent, or Firm* — Xsensus LLP

(57) ABSTRACT

An information processing method for monitoring errors that occur in an information processing apparatus includes: (A) capturing an image to be outputted to a console, sequentially; (B) determining whether the captured image satisfies a condition regarding a preset error display screen; and (C) upon determining that the captured image satisfies the condition, saving in a saving area of a memory unit, data of images that were captured within a predetermined time period, which includes a time when the image that satisfies the condition was captured, or data of a predetermined number of images, which include the image that satisfies the condition.

10 Claims, 11 Drawing Sheets

(56) References Cited

U.S. PATENT DOCUMENTS

2010/0058123 A1 3/2010 Yamashirodani et al.
2013/0262935 A1 10/2013 Kutchuk et al.

FOREIGN PATENT DOCUMENTS

| JP | 2010-56928 | 3/2010 |
| JP | 2010-86345 | 4/2010 |
| JP | 2010-122952 | 6/2010 |
| JP | 2011-39807 | 2/2011 |
| JP | 2012-18658 | 1/2012 |

OTHER PUBLICATIONS

Written Opinion dated Aug. 5, 2014 in PCT/JP2014/063392, filed on May 20, 2014(with Partial English Translation).

* cited by examiner

DESIGNATION OF CAPTURING ERROR SCREEN

· TIME PERIOD FOR PERIODICALLY SAVING IMAGES   :___1 SECOND

· TIME PERIOD BEFORE ERROR IMAGE DETECTION   :___60 SECONDS

· TIME PERIOD AFTER ERROR IMAGE DETECTION   :___10 SECONDS

[ DESIGNATE ERROR IMAGE INFO. ]   : TWO REGISTERED CASES

[ SET ]   [ CANCEL ]

INFORMATION PROCESSING APPARATUS, INFORMATION PROCESSING SYSTEM AND METHOD FOR MONITORING ERRORS

CROSS-REFERENCE TO RELATED APPLICATIONS

This application is a continuing application, filed under U.S.C. section 111(a), of International Application PCT/JP2014/063392, filed on May 20, 2014, the entire contents of which are incorporated herein by reference.

FIELD

This invention relates to a monitoring technique for an information processing apparatus.

BACKGROUND

As for any abnormal events of an internal processing in an information processing apparatus such as a server, internal logs are analyzed to clear up their causes by typically using system event logs recorded by an Operating System (OS), and/or error logs or status logs recorded by an application program. In addition, when any abnormal event occurs in the internal processing, an error display is performed on a screen in addition to recording the internal log. The screen (also referred to as "an error screen") on which the error display is performed includes information representing a type of the abnormal event, a cause of the abnormal event, and a countermeasure after the abnormal event. The blue screen of Windows (registered trademark), a kernel panic screen of Linux (registered trademark) and a purple screen of VMware (registered trademark) correspond to the error screen, for example.

In case of the error message which an application program displays, it is possible to manually record the screen shot. However, because the OS does not work at an occurrence of the blue screen or kernel panic, it is difficult to record the screen shot of the error screen as it is. Particularly, the display time of these error screens may be short, accordingly, it is difficult for an unskilled operator to record contents of the error screen.

Moreover, when analyzing the error, operation contents up to the occurrence of the error may be useful, however, some cases frequently occur, where there is no reproducibility of the error or it is impossible to reproduce operations up to the occurrence of the error.

Patent Document 1: Japanese Laid-open Patent Publication No. 2010-56928
Patent Document 2: Japanese Laid-open Patent Publication No. 2010-86345
Patent Document 3: Japanese Laid-open Patent Publication No. 2012-18658
Patent Document 4: Japanese Laid-open Patent Publication No. 10-66061

SUMMARY

Namely, it is impossible for background arts to record data of useful images for error analysis.

An information processing method relating to this invention includes (A) capturing an image to be outputted to a console, sequentially; (B) determining whether the captured image satisfies a condition regarding a preset error display screen; and (C) upon determining that the captured image satisfies the condition, saving in a saving area of a memory unit, data of images that were captured within a predetermined time period, which includes a time when the image that satisfies the condition was captured, or data of a predetermined number of images, which include the image that satisfies the condition.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
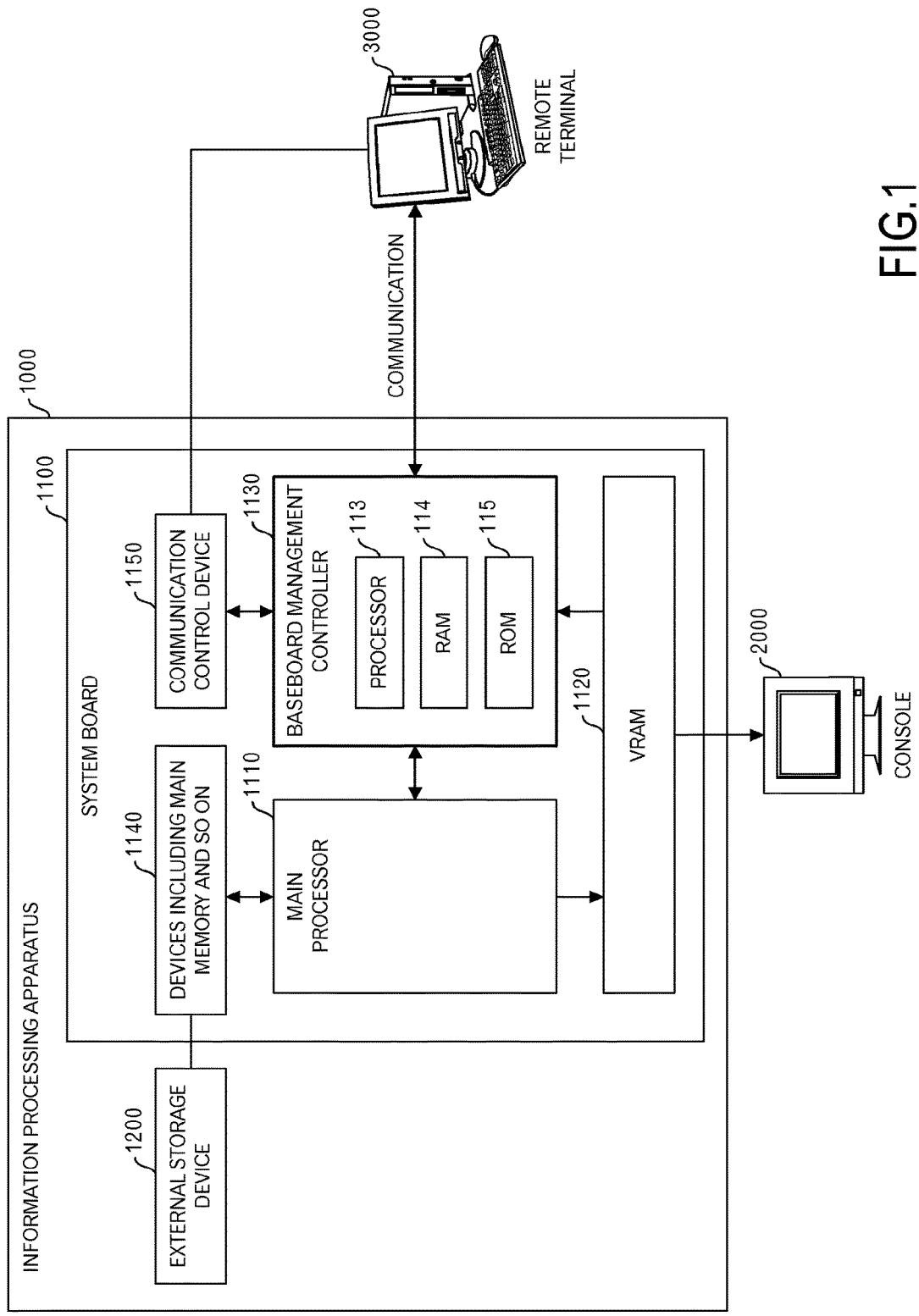
FIG. 1 is a diagram representing an outline of an information processing system relating to an embodiment.

FIG. 1 illustrates an outline of an information processing system relating to an embodiment of this invention. The information processing system relating to this embodiment includes an information processing apparatus 1000, a console 2000 of the information processing apparatus 1000, and a remote terminal 3000 that is connected through a network such as a Local Area Network (LAN).

The information processing apparatus 1000 has a system board 1100, and an external storage device 1200 that includes a hard disk drive, other disk drive device or the like. The system board 1100 has a main processor 1110, devices 1140 such as a main memory and a controller of the external storage device 1200, a communication control device 1150 to communicate through the network such as a LAN, a VRAM (Video RAM (Random Access Memory)) 1120 to which image data of a screen displayed on the console 2000 is written, and a baseboard management controller 1130 that executes a main processing relating to this embodiment.

The main processor 1110, the devices 1140, the VRAM 1120 and the like are components to execute a primary processing of the information processing apparatus 1000.

For example, the baseboard management controller (BMC) 1130 utilizes an Intelligence Platform Management Interface (IPMI) to monitor states of devices on the system board such as a temperature sensor, a CPU status, a speed of a fan and a voltage. Moreover, the baseboard management controller 1130 performs operations for server restart, the power supply and the like, which are instructed from the remote terminal 3000, and enables BIOS (Basic I/O System) settings and remote accesses to OS console information. The baseboard management controller 1130 may also be referred to as "a remote management controller".

Thus, the baseboard management controller 1130 has a function to capture image data written in the VRAM 1120, and performs communication with the remote terminal 3000 through the communication control device 1150.

As hardware, the baseboard management controller 1130 has a processor 113, a RAM 114 and a ROM (Read Only Memory) 115. In addition, the processor 113 realizes various functions of the baseboard management controller 1130 by loading into the RAM 114 and executing programs stored in the ROM 115.

Figure 2:
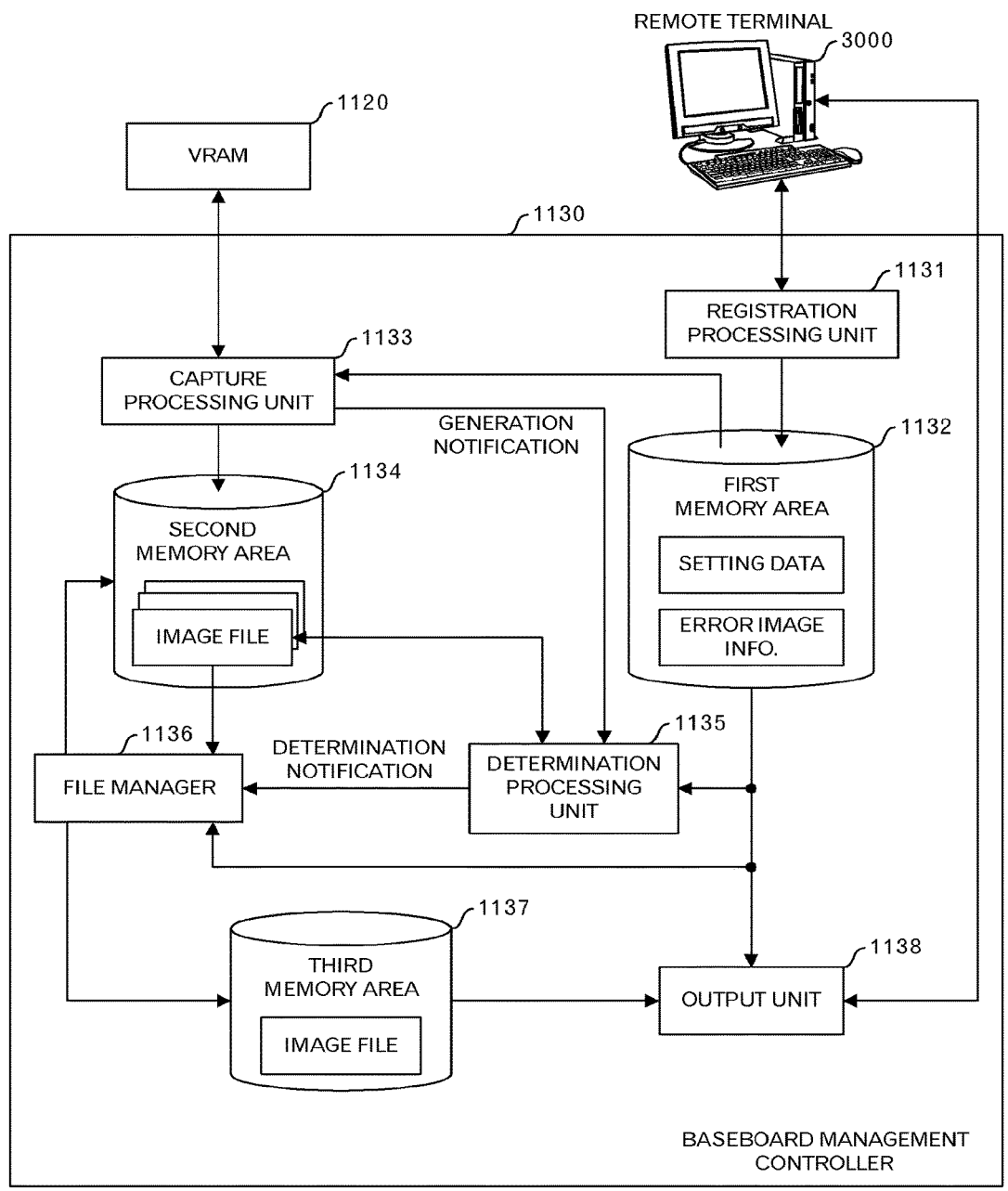
FIG. 2 is a functional block diagram of a baseboard management controller.

FIG. 2 illustrates a configuration of functions that are realized by the baseboard management controller 1130 and relates to this embodiment.

The baseboard management controller 1130 has a registration processing unit 1131, a first memory area 1132, a capture processing unit 1133, a second memory area 1134 that is a temporary memory area, a determination processing unit 1135, a file manager 1136, a third memory area 1137 that is a permanent memory area, and an output unit 1138.

The registration processing unit 1131 stores in the first memory area 1132, setting data and error image information including feature data as an image of the screen of the console 2000 onto which the error display is made, in response to an instruction from the remote terminal 3000.

The capture processing unit 1133 sequentially captures data of images stored in the VRAM 1120 according to the setting data stored in the first memory area 1132 to generate image files, and stores the generated files in the second memory area 1134. The capture processing unit 1133 captures data of the image from VRAM 1120, for example, periodically.

When the determination processing unit 1135 receives a generation notification of the image file from the capture processing unit 1133, the determination processing unit 1135 determines whether or not the image file stored in the second memory area 1134 satisfies a condition defined in the error image information. When the image file satisfies the condition defined in the error image information, the determination processing unit 1135 outputs a determination notification to the file manager 1136. The image that satisfies the condition defined in the error image information is referred to as "an error image".

The file manager 1136 stores predetermined image files that include the image file relating to the determination notification in the third memory area 1137, and performs a processing to delete old image files in the second memory area 1134.

The output unit 1138 transmits the image files stored in the third memory area 1137 to the remote terminal 3000, for example, in response to a request from the remote terminal 3000.

Next, by using FIGS. 3 to 17, details of processing of the baseboard management controller 1130 will be explained. First, details of processing of the registration processing unit 1131 will be explained by using FIGS. 3 to 7.

Figures 3, 4:
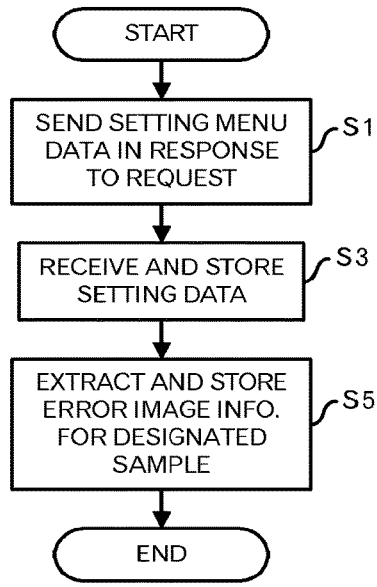
FIG. 3 is a diagram depicting a processing flow of a processing executed by a registration processing unit.
FIG. 4 is a diagram depicting an example of a setting menu screen.

The registration processing unit 1131 transmits setting menu data to the remote terminal 3000, for example, in response to a request from the remote terminal 3000 (FIG. 3: step S1). On the other hand, when the remote terminal 3000 receives the setting menu data, the remote terminal 3000 displays a setting menu screen as illustrated in FIG. 4.

In an example of FIG. 4, the following items are set, namely, a time period for periodically saving images, which is a period to capture image data by the capture processing unit 1133, a time period before error image detection, which represents a period to define a range of images to be saved among images captured before the error image detection, and a time period after the error image detection, which represents a period to define a range of images to be saved among images captured after the error image detection.

Furthermore, in FIG. 4, the following buttons are also provided, namely, a button to designate error image information that represents a condition of an error image to be extracted, a setting button to send the setting data and the error image information to the baseboard management controller 1130 and a cancel button to cancel the setting. In the example of FIG. 4, it is represented that selections of two kinds of sample error images have been made for the error image information.

For example, when the button to designate the error image information is clicked, a selection screen of samples of error images that are held in advance is displayed, and an operator selects any of the samples.

Figure 5:
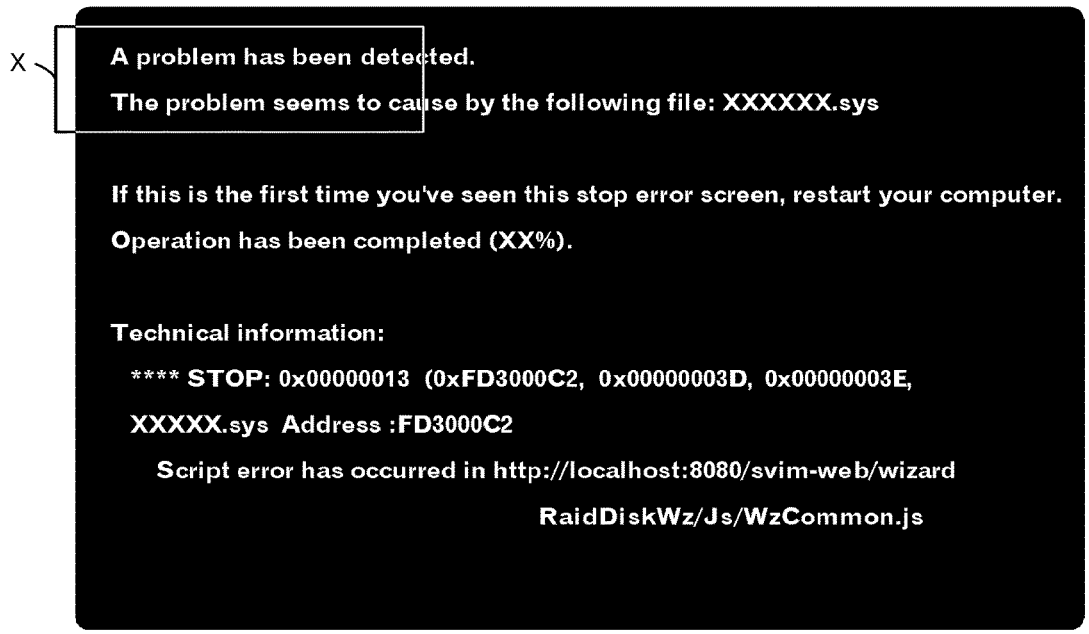
FIG. 5 is a diagram depicting an example of a sample of an error image.

For example, an example of the sample of the error image is depicted in FIG. 5. The example of FIG. 5 includes a portion that includes standardized sentences of the error image, a portion that represents names of relating files, a portion peculiar to the error and the like. In case of this embodiment, it is preferable to select the portion X that includes the standardized sentences.

Figure 6:
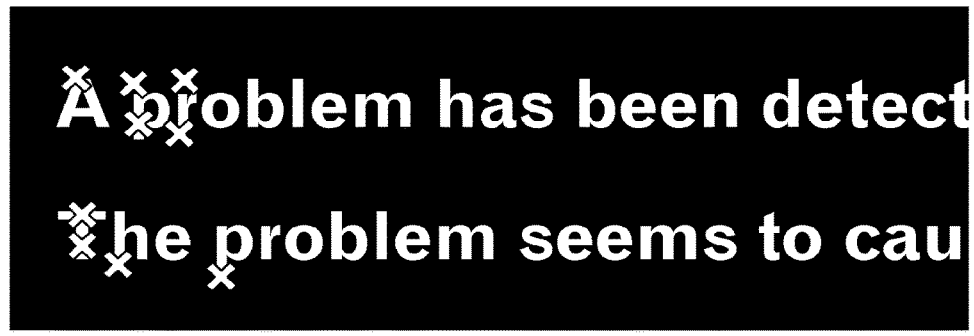
FIG. 6 is a diagram depicting an example of an image generated by expanding a portion of the sample.

FIG. 6 depicts the expanded portion X in FIG. 5, and in the portion X that includes the standardized sentences, n sets of coordinate values of an arbitrary dot (pixel) and pixel values (e.g. RGB values) are extracted.

Figure 7:
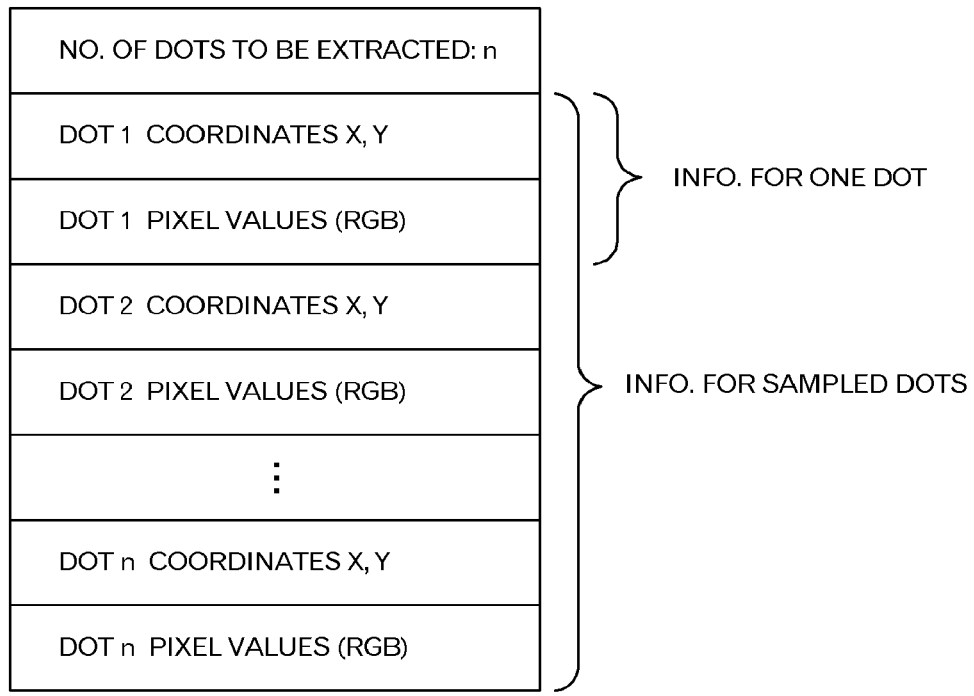
FIG. 7 is a diagram depicting a format example of error image information.

Therefore, as the error image information, the error image information in a format as illustrated in FIG. 7 is obtained. In other words, the number n of dots to be extracted and n sets of the coordinate values and pixel values are included.

The operator of the remote terminal 3000 may only select a sample to automatically employ the error image information prepared in advance for that sample. In addition, after the operator designates the portion X that includes the standardized sentences, the dots may randomly be selected, or the operator may designate dots themselves to extract the error image information as illustrated in FIG. 7.

Data set on the setting menu screen in FIG. 4 is sent from the remote terminal 3000 to the baseboard management controller 1130 of the information processing apparatus 1000.

The registration processing unit 1131 of the baseboard management controller 1130 receives data that was set by the operator from the remote terminal 3000, and stores the time period for periodically saving images, the time period before the error image detection and the time period after the error image detection as the setting data, in the first memory area 1132 (step S3).

In addition, the registration processing unit 1131 extracts the error image information based on the sample of the error image, which is included in the received data and was designated by the operator, and stores the extracted error image information in the first memory area 1132 (step S5).

At the step S5, when a type of the sample is merely designated, the error image information prepared in advance may be readout, however, at this stage, dot positions may randomly be determined from the portion X that is predetermined and includes the standardized sentences to extract the error image information. On the other hand, when the dot positions in the designated sample are designated by the operator, the pixel values at the dot positions may be extracted from the designated sample.

Figure 8:
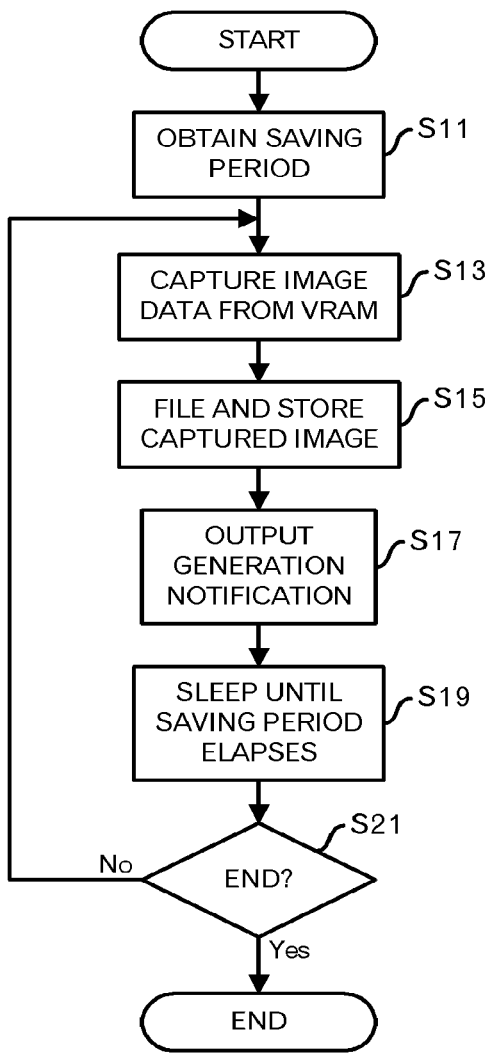
FIG. 8 is a diagram depicting a processing flow of a processing executed by a capture processing unit.

Next, details of processing of the capture processing unit 1133 will be explained by using FIG. 8.

Firstly, the capture processing unit 1133 obtains data of the time period for periodically saving images (step S11).

Then, the capture processing unit 1133 captures image data displayed on the screen of the console 2000 at this time from the VRAM 1120 (step S13). In addition, a timer of the capture processing unit 1133 starts measuring the time period for periodically saving images.

Then, the capture processing unit 1133 files the captured image and stores the file into the second memory area 1134 (step S15). Furthermore, the capture processing unit 1133 outputs the generation notification of the image file, which includes a file name of the image file, a saving time or the like, to the determination processing unit 1135 (step S17).

After that, the capture processing unit 1133 sleeps until the time period for periodically saving images, which was obtained at the step S11, elapses (step S19).

Then, when the time period for periodically saving images elapses, the processing returns to the step S13 unless the end of the processing is instructed (step S21: No route). On the other hand, when the end of the processing is instructed (step S21: Yes route), the processing ends.

As described above, it is possible for the capture processing unit 1133 to save the error display by scanning the VRAM 1120 periodically, and generating and storing the image file, even when the error display is suddenly made.

Figure 9:
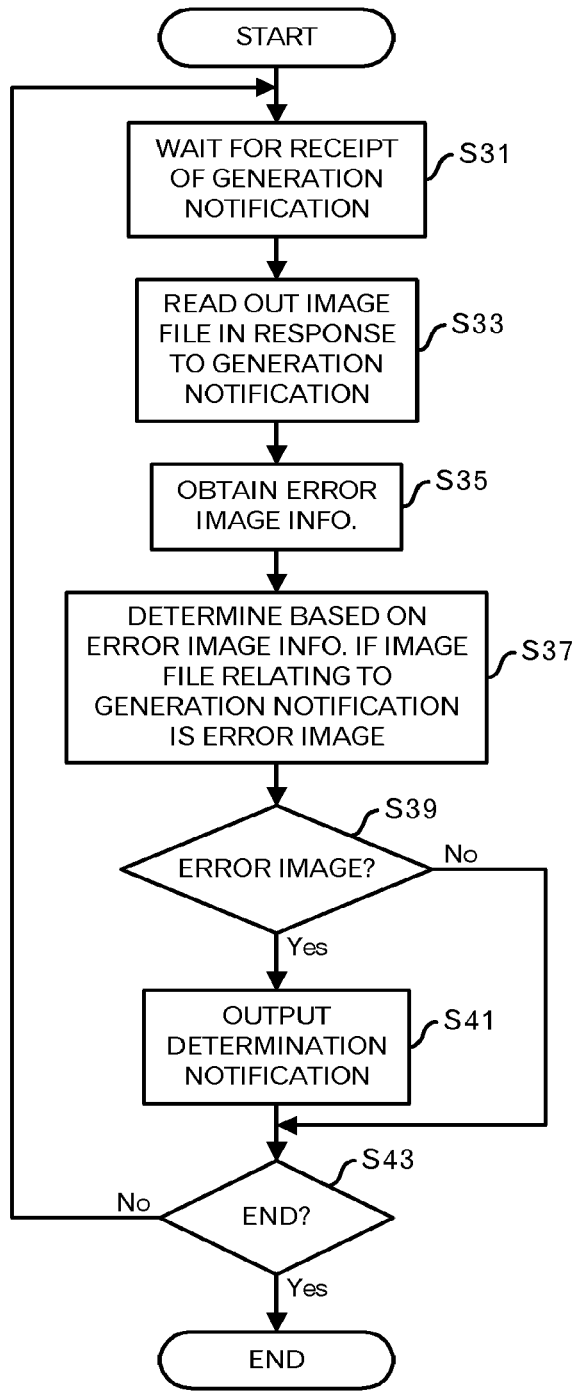
FIG. 9 is a diagram depicting a processing flow of a processing executed by a determination processing unit.

Next, details of processing of the determination processing unit 1135 will be explained by using FIG. 9.

The determination processing unit 1135 waits for receipt of the generation notification from the capture processing unit 1133 (step S31).

Then, when the determination processing unit 1135 receives the generation notification, the determination processing unit 1135 reads out the image file relating to the generation notification from the second memory area 1134 (step S33). When the generation notification includes the image file name or saving time, it is utilized. In addition, the determination processing unit 1135 reads out the error image information from the first memory area 1132 (step S35).

Then, the determination processing unit 1135 determines, based on the error image information, whether or not the image file relating to the generation notification is an error image (step S37).

Specifically, because the error image information includes the coordinate values and pixel values for n dots as illustrated in FIG. 7, pixel values of the same coordinate values in the image of the image file are read out and compared with the corresponding pixel values for each dot. Then, by determining whether or not the pixel values are identical for dots of a predetermined rate or more among the n dots, it is determined whether or not the image file is an error image.

When it is determined that the image file relating to the present generation notification is not the error image (step S39: No route), the processing shifts to the step S43.

On the other hand, when it is determined that the image file relating to the present generation notification is the error image (step S39: Yes route), the determination processing unit 1135 outputs a determination notification that includes the file name or saving time of the image file to the file manager 1136 (step S41).

Then, when the end of the processing is not instructed (step S43: No route), the processing returns to the step S31. On the other hand, when the end of the processing is instructed (step S43: Yes route), the processing ends.

As described above, it becomes possible to detect, as the error image, the image file that has the feature designated by the operator.

Next, details of processing of the file manager 1136 will be explained by using FIGS. 10 to 16. Firstly, an outline will be explained by using FIGS. 10 to 15.

Figure 10:
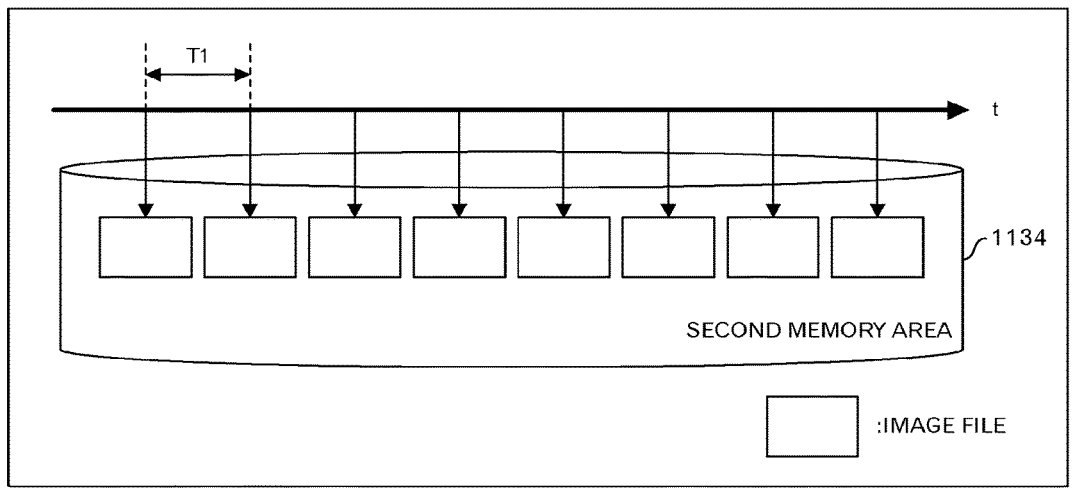
FIG. 10 is a diagram to explain details of processing of a file manager.
Figure 11:
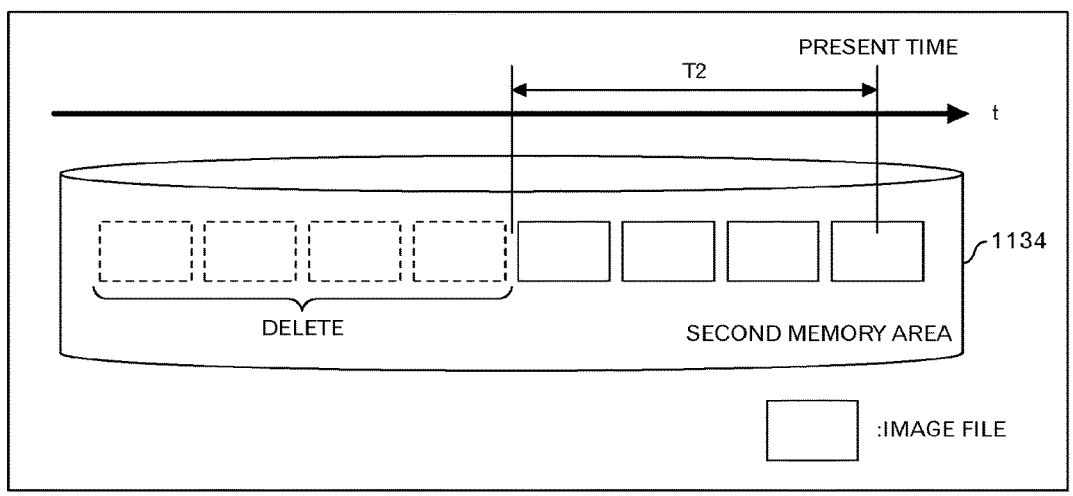
FIG. 11 is a diagram to explain details of processing of the file manager.

As illustrated in FIG. 10, the capture processing unit 1133 periodically stores image files in the second memory area 1134 with the time period T1 for periodically saving images. On the other hand, when the file manager 1136 does not receive the determination notification from the determination processing unit 1135, the file manager 1136 deletes image files that are older than a time when going back to the past by the time period T2 (time period before the error image detection) from the present time, as illustrated in FIG. 11.

Figure 12:
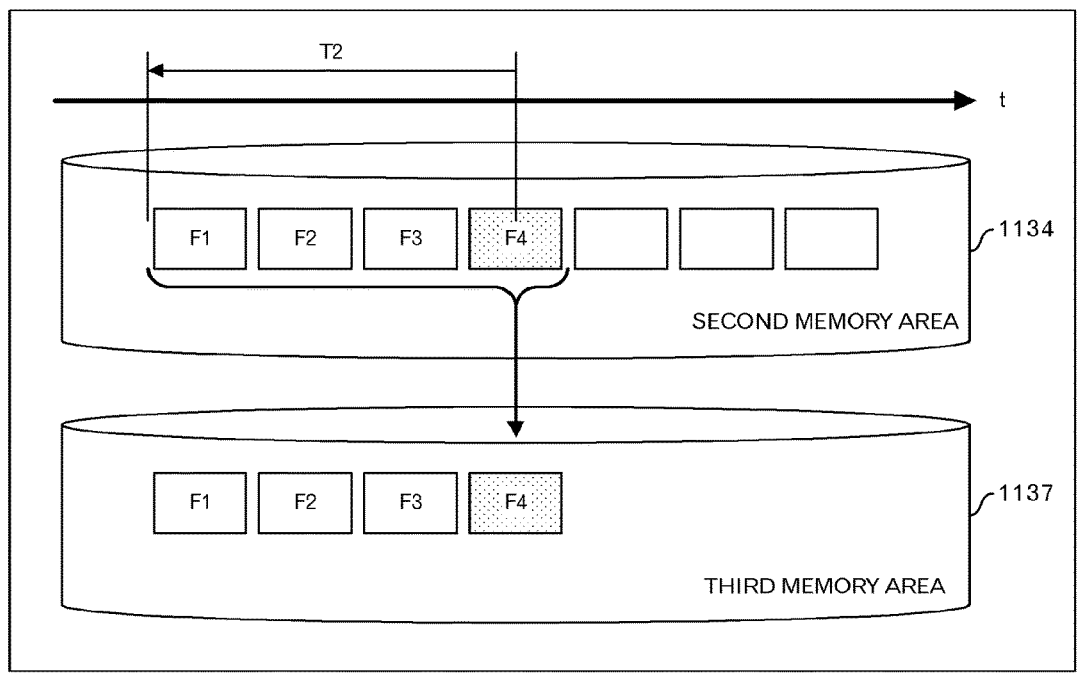
FIG. 12 is a diagram to explain details of processing of the file manager.

On the other hand, when the file manager 1136 receives the determination notification from the determination processing unit 1135, the file manager 1136 identifies the image file F4 of the error image from the determination notification as depicted in FIG. 12, and stores the image file F4 with image files F1 to F3, which were captured and saved during the time period T2 from the saving time of the image file F4 in the third memory area 1137. By doing so, it becomes possible to identify operations and the like, which were performed immediately before the occurrence of the error. It is preferable that the file name or the like of the image file of the error image is changed in order to make it possible to identify the image file of the error image later.

Figure 13:
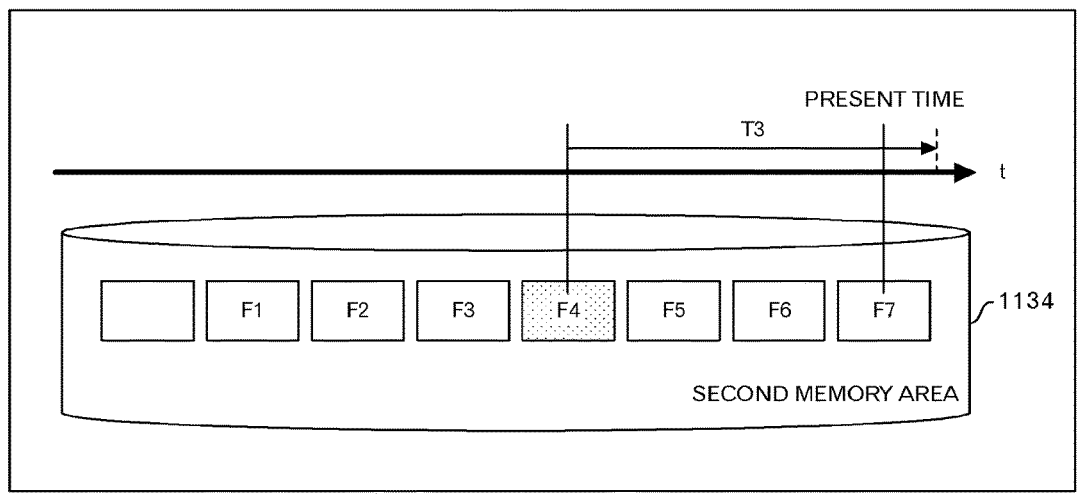
FIG. 13 is a diagram to explain details of processing of the file manager.

In addition, as illustrated in FIG. 13, after receiving the determination notification, the file manager 1136 does not perform anything before the time period T3 (time period after the error image detection) elapses since the occurrence of the error (e.g. saving time of the image file F4 of the error image).

Figure 14:
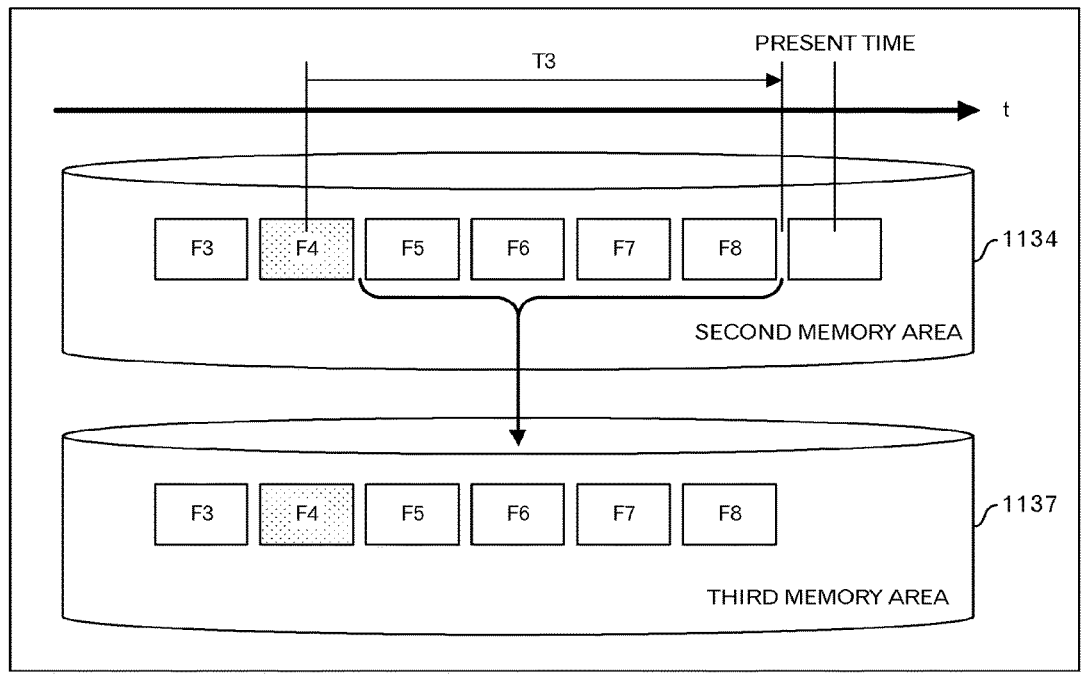
FIG. 14 is a diagram to explain details of processing of the file manager.

On the other hand, as illustrated in FIG. 14, after receiving the determination notification and when the present time is after the time period T3 elapses since the occurrence of the error, the file manager 1136 saves image files F5 to F8 that were captured and saved during the time period T3 since the occurrence of the error, in the third memory area 1137. Then, the file manager 1136 discards the determination notification.

Figure 15:
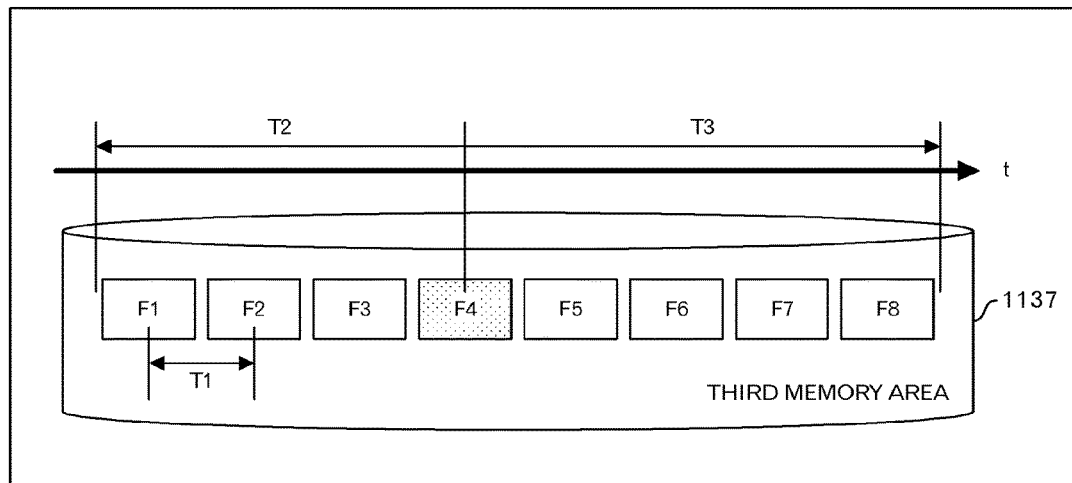
FIG. 15 is a diagram to explain details of processing of the file manager.

Then, as illustrated in FIG. 15, the image files before and after the image file of the error image are also stored. By doing so, it is possible to analyze the error while taking contents of the screens displayed after the error image into consideration.

In this embodiment, the image files to be saved are determined based on the time, however, the image files may be saved based on the number of image files, for example, 3 image files before the image file of the error image and 4 image files after the image file of the error image may be saved with the image file of the error image.

Figure 16:
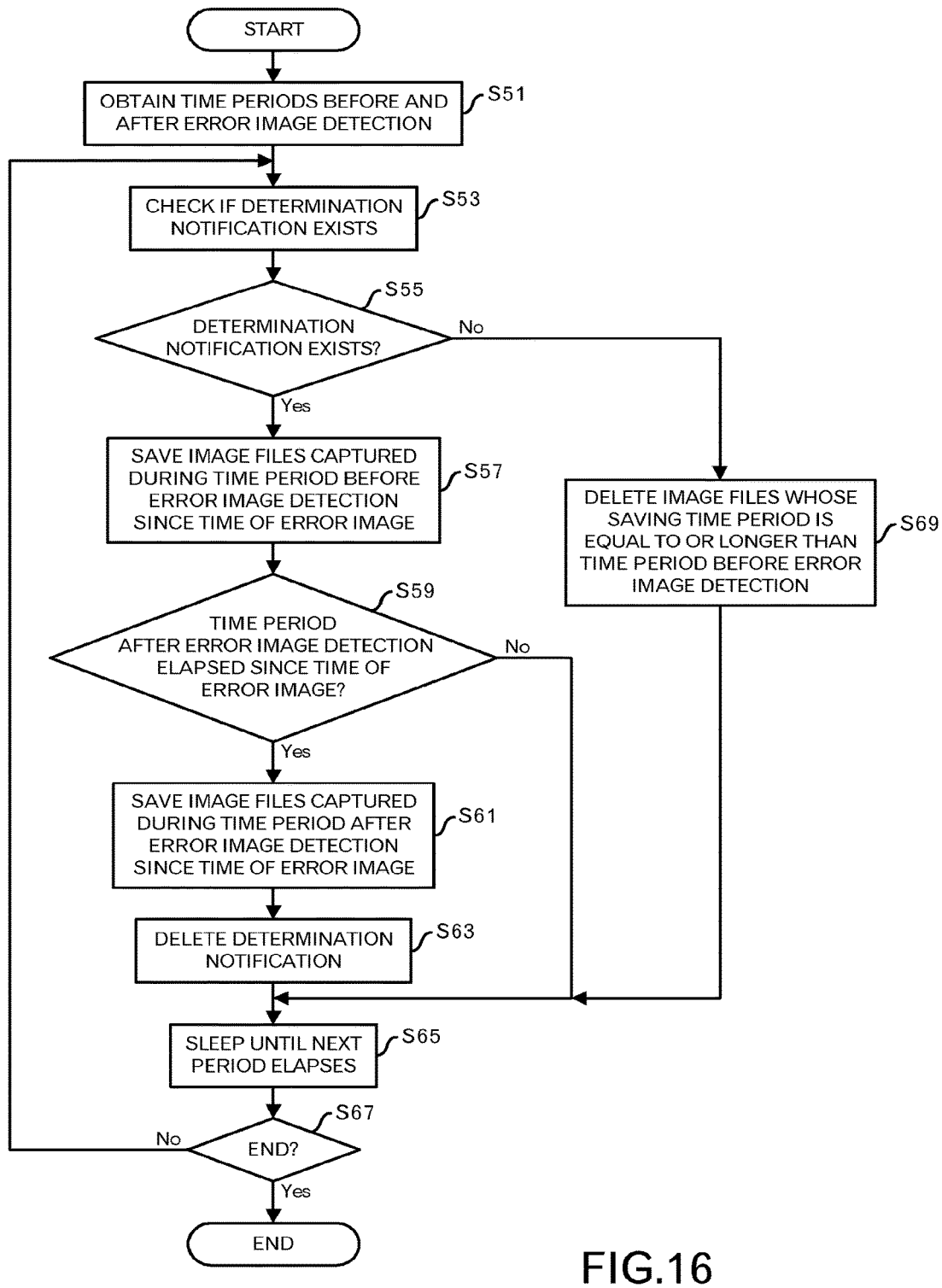
FIG. 16 is a diagram depicting a processing flow of a processing executed by the file manager.

Next, details of processing of the file manager 1136 will be explained specifically by using FIG. 16.

Firstly, the file manager 1136 reads out the time period before the error image detection and the time period after the error image detection from the first memory area 1132 (step S51).

Then, the file manager 1136 checks whether or not there is a determination notification from the determination processing unit 1135 (step S53). When the determination notification does not exist (step S55: No route), the file manager 1136 deletes old image files whose saving time period up to the present time is equal to or longer than the time period before the error image detection, from the second memory area 1134 (step S69). Then, the processing shifts to step S65.

On the other hand, when the determination notification exists (step S55: Yes route), the file manager 1136 saves the image files captured and saved during the time period before the error image detection from the saving time of the image file of the error image in the third memory area 1137 (step S57). The processing as illustrated in FIG. 12 is executed. When there is an image file that has already been saved in the third memory area 1137, only unsaved image files among the image files to be saved are saved.

Then, the file manager 1136 determines, based on the present time, whether or not the time period after the error image detection elapsed since the saving time of the image file of the error image (step S59). When the condition of the step S59 is not satisfied, the processing shifts to the step S65.

On the other hand, when the condition of the step S59 is satisfied, the file manager 1136 stores, in the third memory area 1137, the image files that were captured and saved during the time period after the error image detection after the saving time of the image file of the error image (step S61) as depicted in FIG. 14. After that, the file manager 1136 deletes the determination notification (step S63).

Then, the file manager 1136 sleeps until the next processing period elapses (step S65). Then, when the end of the processing is not instructed (step S67: No route), the processing returns to the step S53. On the other hand, when the end of the processing is instructed (step S67: Yes route), the processing ends.

By performing the aforementioned processing, the image files to be saved are surely saved in the third memory area 1137.

Figure 17:
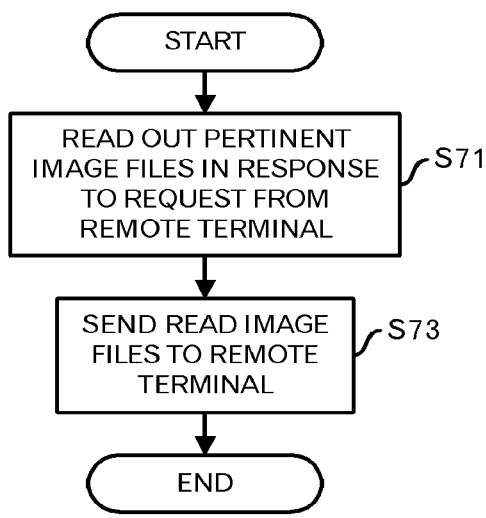
FIG. 17 is a diagram depicting a processing flow of a processing executed by an output unit.

As depicted in FIG. 17, in response to an instruction from the remote terminal 3000, the output unit 1138 reads out the pertinent image files from the third memory area 1137 (step S71). For example, the image file of the error image whose saving time is nearest the designated time is retrieved, and the image files that include the image file of that error image are read out. When identifying the image files, the time period before the error image detection and the time period after the error image detection may be taken into consideration.

Then, the output unit 1138 transmits the read image files to the remote terminal 3000 (step S73). The remote terminal 3000 receives the image files from the information processing apparatus 1000, and stores the read image files in a storage device.

Thus, it becomes possible to perform the analysis of the cause of the error by using the obtained image files.

The occurrence of the abnormal event in the internal processing of the information processing apparatus 1000 is a phenomenon that occurs even in a normal operation. However, even when the abnormal event occurs, it is desired to return from the abnormal state and return to the normal operation. Therefore, except for fatal cases in which the operation cannot continue, there are a lot of cases where the error screen automatically disappears or the error screen can be erased by the operator's operation.

According to this embodiment, it is possible to save the image file of the error image without performing any special operation by the operator and further without being aware of the error being displayed on the screen even if the OS is not working, and it is also possible to trace the occurrence of the error.

Although the embodiment of this invention was explained above, this invention is not limited to this embodiment. For example, the determination processing unit 1135 may not output the determination notification to the file manager 1136, but may perform the notification by changing the file name of the image file of the error image in the second memory area 1134 into the filename representing the error. For example, the time (year, month, date and time) may be employed as the file name basically, and as for the image file of the error image, "E" or the like may be attached to the end or beginning of the filename. In such a case, the file manager 1136 detects the image file of the error image by searching the second memory area 1134 for the file name representing the error, for example, periodically, instead of the determination notification.

Furthermore, the time period before the error image detection and the time period after the error image detection may not be read from the first memory area 1132 by the file manager 1136, but the determination processing unit 1135 may notify the time periods by the determination notification. In such a case, (the saving time of the image file of the error image+the time period after the error image detection) and (the saving time of the image file of the error image−the time period before the error image detection) may be notified.

Instead of managing the image files, the image data may be managed by providing a management table or the like. For example, the management table including the saving time, a flag representing whether or not the image is the error image, a pointer to the image data and the like may be maintained and managed.

Moreover, as for the processing flow, as long as the processing results do not change, the turn of the processing may be exchanged and plural steps may be executed in parallel.

The aforementioned embodiment of this invention is outlined as follows:

The information processing apparatus relating to this embodiment includes (A) a monitoring unit (e.g. baseboard management controller) and (B) a memory to store data of images of screens to be outputted to a console (e.g. VRAM). Then, the aforementioned monitoring unit (b1) has a memory unit, and (b2) sequentially captures an image from the memory, and (b3) determines whether or not the captured image satisfies a condition regarding a preset error display screen, and (b4) saves into a saving area in the memory unit, data of images that were captured within a predetermined time period, which includes a time when the image that satisfies the condition was captured, or data of a predetermined number of images, which include the image that satisfies the condition, upon determining that the captured image satisfies the condition.

By performing the aforementioned processing, it becomes possible to record data of images useful for the error analysis without any leakage.

The aforementioned monitoring unit (b5) may save in the saving area, the captured image and images captured during a first predetermined time period before the aforementioned time, upon determining that the captured image satisfies the condition, and (b6) may save in the saving area, images captured during a second predetermined time period after the aforementioned time, after the second predetermined time period elapsed since the time. By performing the aforementioned processing, it becomes possible to also grasp the state before and after the occurrence of the error.

Furthermore, the aforementioned monitoring unit (b7) may discard images captured during the second predetermined time period after the aforementioned time, after the saving, or discard image captured during the first predetermined time period before a present time in a state where it is not determined that the captured image satisfies the condition. This is performed to decrease the number of image files.

Moreover, the aforementioned condition may be a condition defined by plural combination of coordinate values and a pixel value. Accordingly, it becomes possible to detect appearance of an image similar to a reference image.

An information processing method relating to this embodiment includes (A) capturing an image to be outputted to a console, sequentially; (B) determining whether the captured image satisfies a condition regarding a preset error display screen; and (C) upon determining that the captured image satisfies the condition, saving in a saving area of a memory unit, data of images that were captured within a predetermined time period, which includes a time when the image that satisfies the condition was captured, or data of a predetermined number of images, which include the image that satisfies the condition.

Incidentally, it is possible to create a program causing a computer or a processor to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a RAM or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a memory to store data of images of a screen to be outputted to console; and
a processor that accesses the memory and that:
captures an image from the memory, sequentially;
determines whether the captured image satisfies a condition regarding a preset error display screen;
upon determining that the captured image satisfies the condition, saves in a saving area of a memory unit, data of images that were captured within a predetermined time period, which includes a time when the image that satisfies the condition was captured, or data of a predetermined number of images, which include the image that satisfies the condition, and outputs a result of the determining,
wherein a plurality of sets of coordinates of a pixel in the screen and a pixel value are predefined for the preset error display screen, and
the determining comprises:
comparing, for each of the plurality of sets, the pixel value at the coordinates of the set with a pixel value at the same coordinates within the captured image; and
determining whether or not a ratio of a number of pixels for which the pixel values at the same coordinates are identical is equal to or greater than a predetermined value.

2. The information processing apparatus as set forth in claim 1, wherein the saving comprises:
upon determining that the captured image satisfies the condition, saving in the saving area, the captured image and images captured during a first predetermined time period before the time; and
after a second predetermined time period elapsed since the time, saving in the saving area, images captured during the second predetermined time period after the time.

3. The information processing apparatus as set forth in claim 2, wherein the processor is further configured to discard images captured during the second predetermined time period after the time, after the saving, or discard image captured during the first predetermined time period before a present time in a state where it is not determined that the captured image satisfies the condition.

4. An information processing system, comprising:
an information processing apparatus that comprises a memory to store data of images of a screen to be outputted to a console, and a processor; and
a terminal apparatus connected to the information processing apparatus through a network,
wherein the processor:
captures an image from the data of the images stored in the memory, sequentially;
determines whether the captured image satisfies a condition regarding a preset error display screen; and
upon determining that the captured image satisfies the condition, saves in a saving area of a memory unit, data of images that were captured within a predetermined time period, which includes a time when the image that satisfies the condition was captured, or data of a predetermined number of images, which include the image that satisfies the condition, and outputs a result of the determining,
wherein a plurality of sets of coordinates of a pixel in the screen and a pixel value are predefined for the preset error display screen, and
the determining comprises:
comparing, for each of the plurality of sets, the pixel value at the coordinates of the set with a pixel value at the same coordinates within the captured image; and
determining whether or not a ratio of a number of pixels for which the pixel values at the same coordinates are identical is equal to or greater than a predetermined value,
wherein the terminal apparatus is configured to read out and output the data of the images saved in the saving area through the network.

5. A non-transitory computer-readable storage medium storing a program for causing a processor to execute a process, the process comprising:

capturing an image to be outputted to a console, sequentially;

determining whether the captured image satisfies a condition regarding a preset error display screen; and upon determining that the captured image satisfies the condition, saving in a saving area of a memory unit, data of images that were captured within a predetermined time period, which includes a time when the image that satisfies the condition was captured, or data of a predetermined number of images, which include the image that satisfies the condition, and outputting a result of the determining, wherein a plurality of sets of coordinates of a pixel in the screen and a pixel value are predefined for the preset error display screen, and the determining comprises:

comparing, for each of the plurality of sets, the pixel value at the coordinates of the set with a pixel value at the same coordinates within the captured image; and determining whether or not a ratio of a number of pixels for which the pixel values at the same coordinates are identical is equal to or greater than a predetermined value.

6. An information processing method, comprising:

capturing, by using a computer, an image to be outputted to a console, sequentially;

determining, by using the computer, whether the captured image satisfies a condition regarding a preset error display screen; and upon determining that the captured image satisfies the condition, saving, by using the computer and in a saving area of a memory unit, data of images that were captured within a predetermined time period, which includes a time when the image that satisfies the condition was captured, or data of a predetermined number of images, which include the image that satisfies the condition, and outputting a result of the determining, wherein a plurality of sets of coordinates of a pixel in the screen and a pixel value are predefined for the preset error display screen, and the determining comprises:

comparing, for each of the plurality of sets, the pixel value at the coordinates of the set with a pixel value at the same coordinates within the captured image; and determining whether or not a ratio of a number of pixels for which the pixel values at the same coordinates are identical is equal to or greater than a predetermined value.

7. The information processing apparatus as set forth in claim 1, wherein the processor further extracts the plurality of sets of coordinates of a pixel in the screen and the pixel value from the preset error display screen.

8. The information processing system as set forth in claim 4, wherein the processor further extracts the plurality of sets of coordinates of a pixel in the screen and the pixel value from the preset error display screen.

9. The non-transitory computer-readable storage medium as set forth in claim 5, wherein the process further comprises extracting the plurality of sets of coordinates of a pixel in the screen and the pixel value from the preset error display screen.

10. The information processing method as set forth in claim 6, further comprising extracting the plurality of sets of coordinates of a pixel in the screen and the pixel value from the preset error display screen.

* * * * *